United States Patent
McClure (10) Patent No.: US 10,473,135 B2
(45) Date of Patent: *Nov. 12, 2019

(54) BIASED BLIND SIDE TEMPORARY FASTENERS, SYSTEMS AND METHODS

(71) Applicant: Centrix Inc., Kent, WA (US)

(72) Inventor: Travis McClure, Kirkland, WA (US)

(73) Assignee: Centrix Inc., Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/976,766

(22) Filed: May 10, 2018

(65) Prior Publication Data

US 2018/0258973 A1    Sep. 13, 2018

Related U.S. Application Data

(63) Continuation of application No. 13/273,197, filed on Oct. 13, 2011, now Pat. No. 9,970,468, which is a
(Continued)

(51) Int. Cl.
*F16B 19/10* (2006.01)

(52) U.S. Cl.
CPC ......... *F16B 19/109* (2013.01); *Y10T 403/602* (2015.01)

(58) Field of Classification Search
CPC ............ F16B 2005/0678; F16B 5/0607; F16B 5/0621; F16B 13/04; F16B 13/06; F16B 13/063; B25B 31/005
See application file for complete search history.

(56) References Cited

U.S. PATENT DOCUMENTS

| 1,978,935 A | 10/1934 | Douglas |
| 2,317,315 A | 4/1943 | Wallace |
| (Continued) | | |

FOREIGN PATENT DOCUMENTS

| EP | 0275160 A2 | 7/1988 |
| EP | 1083341 A1 | 3/2001 |
| (Continued) | | |

OTHER PUBLICATIONS

ISA Korean Intellectual Property Office, International Search Report and Written Opinion Issued in Application No. PCT/US2010/001098, dated Jan. 25, 2011, WIPO, 7 pages.
(Continued)

*Primary Examiner* — Michael P Ferguson
(74) *Attorney, Agent, or Firm* — McCoy Russell LLP (57) ABSTRACT

A temporary fastener a plunger having a distal portion including a plurality of plunger fingers, where depressing the plunger causes axial translation of a collet body to place the temporary fastener in an activated state where a plurality of flexible fingers in the collet body radially converge and where releasing the plunger places the temporary fastener in a clamped state in which the plurality of flexible fingers in the collet body are outwardly displaced. The temporary fastener further includes a web element positioned at a proximal end of a rod and including a plurality of opening permitting the plurality of plunger fingers to axially translate there through during depression and release of the plunger. The temporary fastener further includes a spring positioned within a case and exerting a restorative force on the collet body and the plunger in response to depression of the plunger.

19 Claims, 8 Drawing Sheets

Related U.S. Application Data continuation-in-part of application No. PCT/US2010/001098, filed on Apr. 13, 2010.

(60) Provisional application No. 61/212,632, filed on Apr. 13, 2009.

(56) References Cited

U.S. PATENT DOCUMENTS

| | | |
|---|---|---|
| 2,365,787 A | 12/1944 | Wallace |
| 2,370,336 A | 2/1945 | Wallace |
| 2,379,786 A | 7/1945 | Bugg et al. |
| 2,435,146 A * | 1/1948 | Lehman ............. B25B 31/005 269/48.4 |
| 2,439,531 A | 4/1948 | Wallace |
| 2,454,416 A * | 11/1948 | Sittert ............. B25B 31/005 269/48.4 |
| 2,649,884 A | 8/1953 | Westover |
| 2,775,155 A | 12/1956 | Tompkins et al. |
| 2,936,015 A | 5/1960 | Rapata |
| 2,994,242 A | 8/1961 | Buff et al. |
| 3,000,086 A | 9/1961 | Davis |
| 3,469,493 A | 9/1969 | Fisher |
| 3,928,904 A * | 12/1975 | Jones ............. F16B 19/109 29/436 |
| 4,537,542 A | 8/1985 | Pratt et al. |
| 5,065,490 A | 11/1991 | Wivagg et al. |
| 5,240,361 A | 8/1993 | Armstrong et al. |
| 5,704,752 A | 1/1998 | Logerot |
| 5,927,919 A | 7/1999 | Blankenship et al. |
| 6,174,118 B1 | 1/2001 | Rebers |
| 6,179,539 B1 | 1/2001 | Benoit et al. |
| 6,287,044 B1 | 9/2001 | Huber |
| 7,179,037 B2 | 2/2007 | Aukzemas et al. |
| 9,970,468 B2 * | 5/2018 | McClure ............. F16B 19/109 |
| 2002/0144574 A1 | 10/2002 | Avetisian et al. |
| 2004/0081529 A1 | 4/2004 | Stanton et al. |
| 2005/0123372 A1 | 6/2005 | Sato |
| 2005/0169726 A1 | 8/2005 | McClure |
| 2007/0243037 A1 | 10/2007 | Pratt |

FOREIGN PATENT DOCUMENTS

| | | |
|---|---|---|
| FR | 964157 A | 8/1950 |
| GB | 413403 A | 7/1934 |
| GB | 624714 A | 6/1949 |
| GB | 1548964 A | 7/1979 |
| JP | H1151018 A | 2/1999 |
| JP | 2005517876 A | 6/2005 |
| JP | 2010522311 A | 7/2010 |
| WO | 03069971 A2 | 8/2003 |
| WO | 2008118420 A2 | 10/2008 |

OTHER PUBLICATIONS

European Patent Office, Extended European Search Report Issued in Application No. 10778030.6, dated Apr. 5, 2013, Germany, 6 pages.

State Intellectual Property Office of the People's Republic of China, Office Action Issued in Application No. 201080025690.6, dated Apr. 27, 2013, 8 pages.

Japan Patent Office, Office Action Issued in Application No. 2012-505881, dated Jan. 7, 2014, 4 pages. (Submitted with Machine Translation).

State Intellectual Property Office of the People's Republic of China, Office Action Issued in Application No. 201080025690.6, dated Apr. 1, 2014, 7 pages.

Japan Patent Office, Notice of Allowance Issued in Application No. 2012-505881, dated Oct. 7, 2014, 6 pages. (Submitted with Machine Translation).

State Intellectual Property Office of the People's Republic of China, Notice of Allowance Issued in Application No. 201080025690.6, dated Feb. 4, 2015, 3 pages.

* cited by examiner

BIASED BLIND SIDE TEMPORARY FASTENERS, SYSTEMS AND METHODS

CROSS REFERENCE TO RELATED APPLICATIONS

The present application is a continuation of U.S. Non-Provisional patent application Ser. No. 13/273,197, entitled "BIASED BLIND SIDE TEMPORARY FASTENERS, SYSTEMS AND METHODS", and filed on Oct. 13, 2011. U.S. Non-Provisional patent application Ser. No. 13/273,197 is a continuation-in-part of International Application No. PCT/US2010/001098, entitled "BIASED BLIND SIDE TEMPORARY FASTENERS, SYSTEMS AND METHODS", and filed on Apr. 13, 2010. International Application No. PCT/US2010/001098 claims benefit of U.S. Provisional Application No. 61/212,632 entitled "BIASED BLIND SIDE TEMPORARY FASTENERS, SYSTEMS AND METHODS" filed on Apr. 13, 2009. The entire contents of each of the above-listed applications are hereby incorporated by reference for all purposes.

BACKGROUND

Biased blind side temporary fasteners are used primarily to hold at least one work piece, commonly a panel-type material, in registry with another work piece, each defining at least one commonly aligned hole through which the fastener may at least partially pass. Once the two or more work pieces are so aligned and retained, they may be subject to subsequent material processing, e.g., welding, permanent fastening, etc. Examples of environments wherein such fasteners are commonly used include the aerospace and automotive industries.

A common form of such fasteners is the "CLECO" fastener, an example of which can be found in U.S. Pat. No. 4,537,542. In such fasteners, a static central projection anchored to opposing wall portions of the fastener case separates a pair of legs that axially translate about the projection in the working region of the fastener. Depressing a plunger causes the legs to translate along the projection until the distal ends thereof clear the projection, thereby permitting those portions of the legs to collapse toward each other, effectively modifying the external diameter of the distal ends. A spring interfaces with the plunger and the case to resist the plunger depression. The legs are linked to the plunger and therefore assume a clamped state as a nominal state when the spring is permitted to fully extend within the limits of its enclosure.

While this style of fastener may be adequate in certain situations, e.g., low tolerance material processing, the legs are at best only partially hemispherical, which fails to address issues of lateral play between the work pieces when compressively held together by the fastener. Moreover, such fasteners are more likely to react negatively to work piece rotation given the inclusion of three or more elements that are not mechanically linked to each other (there is intentional "float" between all components to permit translation of the legs relative to the projection, but this float is subject to very little restraint in the plane of the projection).

SUMMARY

A biased blind side fasteners for temporarily securing together at least two work pieces that each define an aperture, bore, hole, or orifice (hereinafter collectively "hole" unless otherwise specified) through which at least a portion of the fastener may pass is provided. Methods for making and using fastener embodiments are also provided. Use of the fastener embodiments enable the temporary yet secure association of at least two work pieces wherein a bias element within the fastener causes a clamping force to form between the distal portions or ends of two elements of the fastener, each of which compressively engages with a work piece.

A first series of fastener embodiments according to one example comprises an elongate, hollow case for substantially housing a generally cylindrical collet body and a bias means, and at least partially housing a central rod having a proximal end linked to a proximal portion of the case by a web element, and further comprises a plunger for temporarily overcoming an inherent clamping bias, thus allowing for the insertion of a fastener into the work pieces' holes, wherein the plunger is formed to substantially translatably pass through the web element. Through use of a generally cylindrical collet body, a high level of work piece alignment keyed from the holes or orifices can be achieved, in many instances resulting in a total clearance between the collet body of the fastener and the work piece hole or orifice of less than 0.001" in any radial direction.

A second series of fastener embodiments according to another example comprises an elongate, hollow case for substantially housing a plurality of clamping legs and a bias means, and at least partially housing a central rod having a proximal end linked to a proximal portion of the case by a web element, and further comprises a plunger for temporarily overcoming an inherent clamping bias, thus allowing for the insertion of a fastener into the work pieces' holes, wherein the plunger is formed to substantially translatably pass through the web element.

The collet body of the first series of fastener embodiments is similar in construction and function to those disclosed in WO 03/069971 (application number PCT/US03/02925), the disclosure of which is incorporated herein. In summary, a collet body according to the fastener embodiments includes an axis and comprises an outer surface defining an outer diameter, an inner surface defining an inner diameter, a distal portion having a distal end defining a first opening and a proximal portion having a proximal end defining a second opening, wherein the distal portion comprises a plurality of flexible fingers, distal portions of which constitute the collet body distal end and at least partially define the first opening, and further comprise gripping portions extending radially from the outer surface thereof.

With respect to the plurality of flexible fingers, many embodiments have fingers with a radially converging bias, whereby the distal portions of the fingers radially converge to establish a reduced inner surface diameter at the collet body distal end (a tapered form). As will be described in more detail below, this reduced inner surface diameter is less than the outer surface diameter of a central rod.

The collet body gripping portions referenced earlier include a leading face and a trailing face, the latter of which constitutes a reactive surface for compressively contacting the face of a work piece and are substantially orthogonal to the collet body axis. The convergence of each leading face and trailing face defines a peripheral edge or portion that represents the maximum diameter of the collet body thereat when considered in view of any other gripping portions and when the collet body is in a generally (non-tapered) cylindrical form.

It should be noted that when the collet body fingers are in a radially converged state, the maximum external surface diameter at its gripping portions is less than any diameter of a working portion of the collet body (as used herein, the working portion of the collet body is that portion of the collet body that may reside or outside the case during operation of a fastener embodiment, i.e., the stoke of the collet body). By establishing this limit to the external surface diameter, the distal end of the collet body will be able to traverse each work piece hole in order for the gripping portions to reach an opposing work piece reactive surface. As will be described in more detail below, this limitation also facilitates fabrication of certain embodiments.

The generally cylindrical case functions as a housing for at least part of all elements comprising the fastener embodiments, and primarily encompasses the bias means and most of the collet body during a nominal state. The case includes an outer surface defining an outer diameter, an inner surface defining an inner diameter of sufficient dimension to accept the collet body, a distal end defining a first opening and a proximal end defining a second opening, the two ends being separated by a body portion.

In addition to providing translational guidance for certain embodiment elements as will be described in more detail below with respect to selected fastener embodiments, the case directly or indirectly provides both a work piece reactive surface and retention means in the form of an inner surface reduced diameter portion at the distal end thereof. In the case of the former, the distal end outer surface functions as a reactive surface when abutted against a work piece during use of fastener embodiments; in the case of the latter, the minimum inner surface diameter at or proximate to the distal end (the reduced inner diameter portion) is sized to permit translation of at least the working portion of the collet body there through, but preferably not so great so as to permit translation of the gripping portion of the collet body distal end there through when the same is in a non-tapered or expanded state.

The rod functions as a guide for reciprocal motion of the collet body, and a structure to radially outwardly displace the collet body fingers while the device is in an operative or nominal state. The rod includes an outer surface and comprises a distal end and a proximal end separated by a body portion. Like the prior art, the rod remains substantially axially stationary during operation of the various device embodiments. However, with respect to the first series of fastener embodiments, it accommodates a fully cylindrical means for engaging a distal or blind work piece by anchoring its proximal end to a proximal portion of the case. In this manner, the collet body, which wholly surrounds the rod, is free to reciprocate from the proximal end of the rod to the distal end of the rod, although when assembled, the case functionally limits the extent of such reciprocation.

The bias means, which is often times a compression spring, is held substantially within the confines of the case and engages the case and the collet body. In many embodiments, the bias means reacts against the reduced diameter portion of the case at a first end and an increased diameter portion at the proximal end of the collet body. As a consequence of this arrangement, movement of the collet body distal end towards the case reduced diameter portion is resisted by the bias meas. This resistance is elastic in nature and creates a restorative force between the collet body distal end and the case reduced diameter portion when the collet body is displaced from its nominal position.

In a nominal state, there is preferably at least some bias present between the case (which acts as a mechanical ground) and the collet body such that the collet body distal end is in compression with the distal end of the case. In this manner, even exceptionally thin work pieces can be subjected to the clamping effect of the fastener. Preferably, substantially all of the bias means force is present in this nominal state.

The plunger is the element responsible for imparting translation to the collet body when its compression force exceeds the bias of the bias means. Thus, when the restorative force of the bias means is overcome by the compression force imparted by the plunger, the distal end of the collet body is caused to translate towards distal end of the rod. Depending upon the length of the rod exposed to the environment, the distal end of the collet body will at some point translate past the distal end of the rod, thereby permitting a radial constriction bias in the collet body fingers to radially converge the fingers. In this state, the maximum diameter of the collet body at the gripping elements is equal to or less than the outer diameter of the collet body at its working portion. Those persons skilled in the art will of course appreciate that even if the fingers are not fully collapsed, an insertion force presented against the gripping elements leading face, which are acute to the collet body axis, will impart an additional radial convergence force, thereby causing further radial convergence and functionally achieving the desired diameter reducing effect.

Because the bias means must be between the case and the collet body, and because the plunger must act, directly or indirectly, upon the collet body, a way must exist for the plunger to act on the collet body while still permitting the rod to be linked to the mechanical ground of the case in order to be substantially axially static. Embodiments of the fastener provide a solution by including a web element at the proximal portion of the rod and the proximal portion of the case. The web element includes a plurality of openings through which conforming fingers of the plunger may pass. Thus, plungers according to one embodiment comprise an outer surface defining an outer diameter, an inner surface defining an inner diameter, a distal portion having a distal end defining a first opening and a proximal portion having a proximal end comprising a head portion, wherein the distal portion comprises a plurality of fingers, distal portions of which at least partially define the first opening and lateral faces of which define a plurality of slots, two each being circumferentially adjacent to each finger. The lateral faces are preferably spaced from each other a distance no greater than the distance between corresponding structures in the web element, thus permitting the fingers to axially translate within the confines of the web openings.

The web element may be part of either the case or the rod, or may be a discrete component introduced during assembly of a fastener according to these features. Preferably, the web element comprises a plurality of radially aligned arms like spokes on a wheel where the hub is the rod and the wheel is the case inner surface. By having a discontinuous periphery, i.e., the case inner surface is exposed within the arc sections, the plunger outer surface diameter can closely match that of the case inner surface diameter, and benefit from a close fit relationship there with as described below, and can further better engage the collet body. In any event, the web element is at least temporarily fixedly attached to both the case and the rod.

To prevent unintended egress of the plunger fingers, many embodiments have fingers that comprise a radially extending flange that interferes with a locking ring or washer inserted at the web element after insertion of the plunger fingers. This locking ring or washer may then serve two purposes: to prevent egress of the plunger finger distal ends from inside the case via the web element openings, and prevent egress of the web element (and therefore also the rod) from inside the case.

Because the stroke of the plunger is proportional to the stroke of the collet body, the stroke can be substantial in comparison to the plunger outer diameter. Recalling that the plunger does not begin to envelope the rod until that portion of the plunger enters the case (and that the rod is substantially translationally fixed during operation of the fastener), any translation guidance can only be established no earlier than the case proximal end when the rod is being translated into the case. Therefore, consideration may be given to the potential that the plunger axis will fail to remain coaxial with that of the rod (hereinafter a "canted" relationship). It then becomes desirable in certain embodiments to incorporate splines or similar meshing engagements between the plunger and the rod and/or case.

These alignment means for facilitating proper stroke orientation may be formed on any element that directly contacts the plunger. Thus, the plunger outer surface may comprise lands and/or grooves that interact with functionally complementary structure formed on the inner surface of the case or with a bushing linked to the case through which the plunger passes. Similarly, the plunger inner surface may comprise lands and/or grooves that interact with functionally complementary structure formed on the outer surface of the rod. Additionally, sectional faces that define a plurality of fingers of the plunger may interact with lands formed in the case inner surface or with a web element present, as in one series of embodiments, at the proximal end of the case. Of course, the simplest form of alignment means is a close fit relationship between a smooth cylindrical rod outer surface and a smooth cylindrical plunger inner surface in at least one portion of the plunger and/or rod. The skilled practitioner will of course appreciate that a myriad of combinations of the above concepts is possible, and that such permutations are considered within the parameters of the present invention.

For purposes of this patent, the terms "area", "boundary", "part", "portion", "surface", "zone", and their synonyms, equivalents and plural forms, as may be used herein and by way of example, are intended to provide descriptive references or landmarks with respect to the article and/or process being described. These and similar or equivalent terms are not intended, nor should be inferred, to delimit or define per se elements of the referenced article and/or process, unless specifically stated as such or facially clear from the several drawings and/or the context in which the term(s) is/are used.

DETAILED DESCRIPTION

The terminal end of any numeric lead line in the several drawings, when associated with any structure or process, reference or landmark described in this section, is intended to representatively identify and associate such structure or process, reference or landmark with respect to the written description of such object or process. It is not intended, nor should be inferred, to delimit or define per se boundaries of the referenced object or process, unless specifically stated as such or facially clear from the drawings and the context in which the term(s) is/are used. Unless specifically stated as such or facially clear from the several drawings and the context in which the term(s) is/are used, all words and visual aids should be given their common commercial and/or scientific meaning consistent with the context of the disclosure herein.

With the foregoing in mind, the following description is presented to enable a person skilled in the art to make and use the claimed invention. Various modifications to the described embodiments will be readily apparent to those skilled in the art, and the generic principles disclosed herein may be applied to other embodiments and applications thereof without departing from the spirit and scope of the present invention, as defined by the appended claims. Thus, the claimed invention is not intended to nor should be limited to the disclosed and/or described embodiments, but is to be accorded the widest scope consistent with the principles and features disclosed herein.

Figure 11:
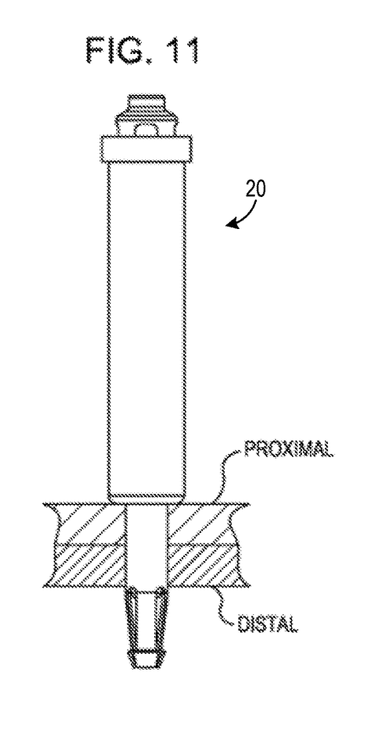
FIG. 11 is an elevation view of the first fastener embodiment inserted into the aligned holes of two work pieces wherein the plunger has been depressed to cause the collet body distal end to translate past the distal end of the rod.
Figure 12:
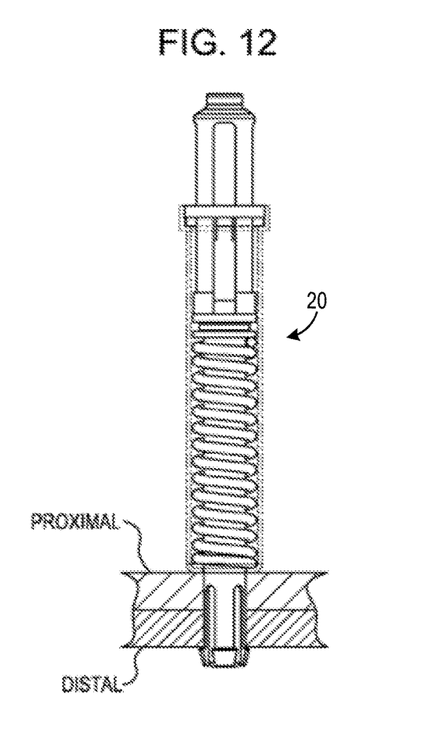
FIG. 12 shows the embodiment of FIG. 11 in a clamped up state, after release of the plunger.
Figure 13:
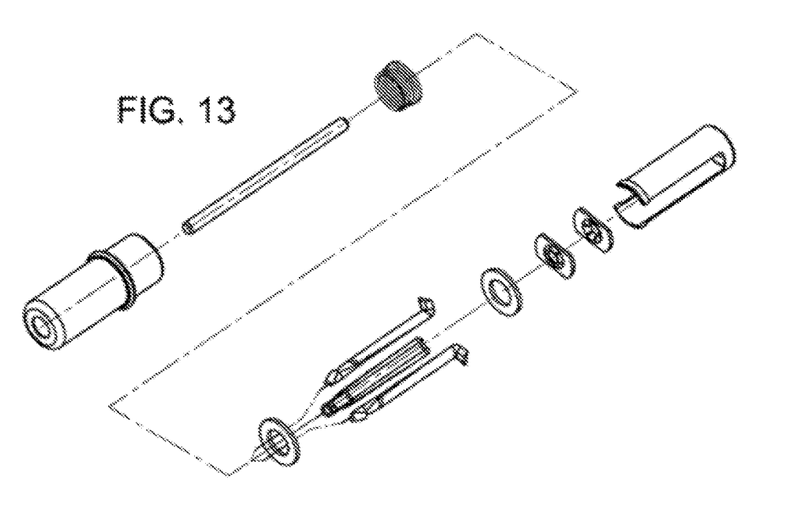
FIG. 13 is an exploded perspective view of a second embodiment of a fastener.
Figure 14A:
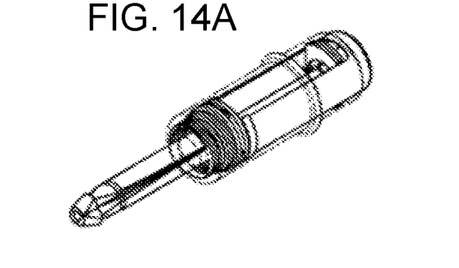
FIGS. 14A-14F are various perspective views of the embodiment of FIG. 13 in nominal, partially active and fully active states.
Figure 14B:
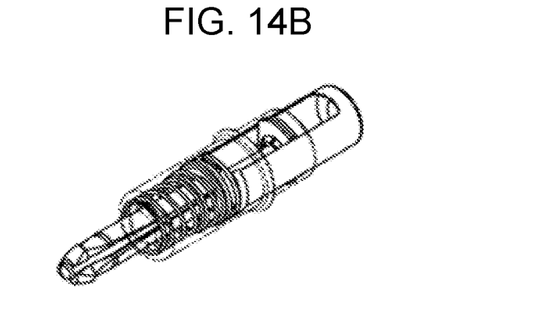
Figure 14C:
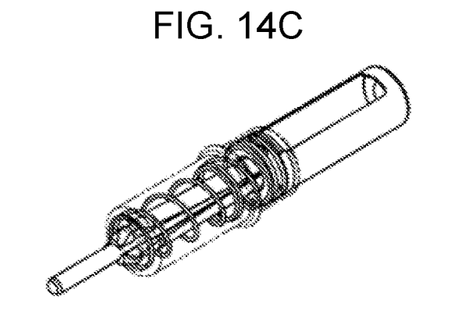
Figure 14D:
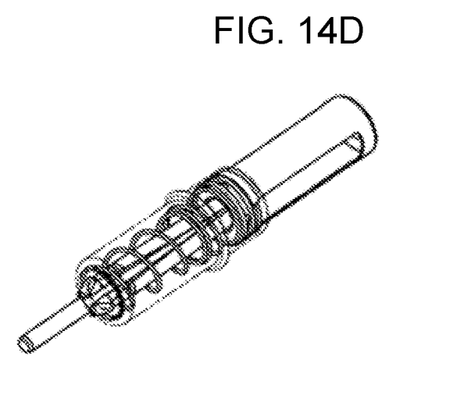
Figure 14E:
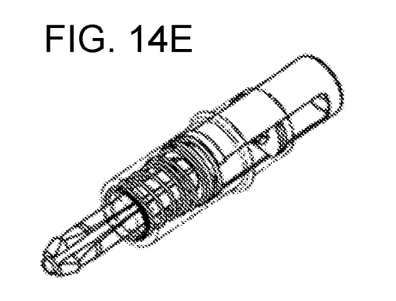
Figure 14F:
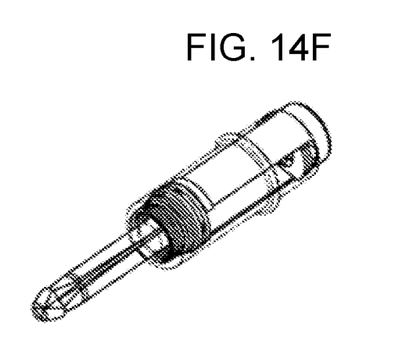

Turning then to the several embodiments, wherein like numerals indicate like parts, and more particularly to FIGS. 1-4, a first fastener embodiment 20 shown. With particular attention for the moment to FIG. 4, fastener 20 comprises the following primary elements: collet body 30, case 50, rod 70, bushing 100, plunger 130 and locking ring 120. Returning then to FIGS. 1-3, it can be seen that collet body 30 includes outer surface 32 (and by implication, an inner surface), distal end 36 and proximal end 44. At a distal portion of collet body 30 are a plurality of fingers 38 defined largely by slots 42. Fingers 38 further include gripping elements 40, which include an acute leading face or chamfer as well as a trailing face for reacting against a distal work piece, as is best shown in FIGS. 11 and 12.

Collet body 30 partially surrounds rod 70, and includes outer surface 72, distal end 74, which includes chamfer 76 to facilitate radial expansion or contraction of fingers 38 during translation of collet body distal end 36 there past, and second end 78. As will be described in greater detail below, proximal end 78 engages with case 50 to provide a means for mitigating or preventing axial movement of rod 70 relative to case 50.

Figures 1, 2, 3:
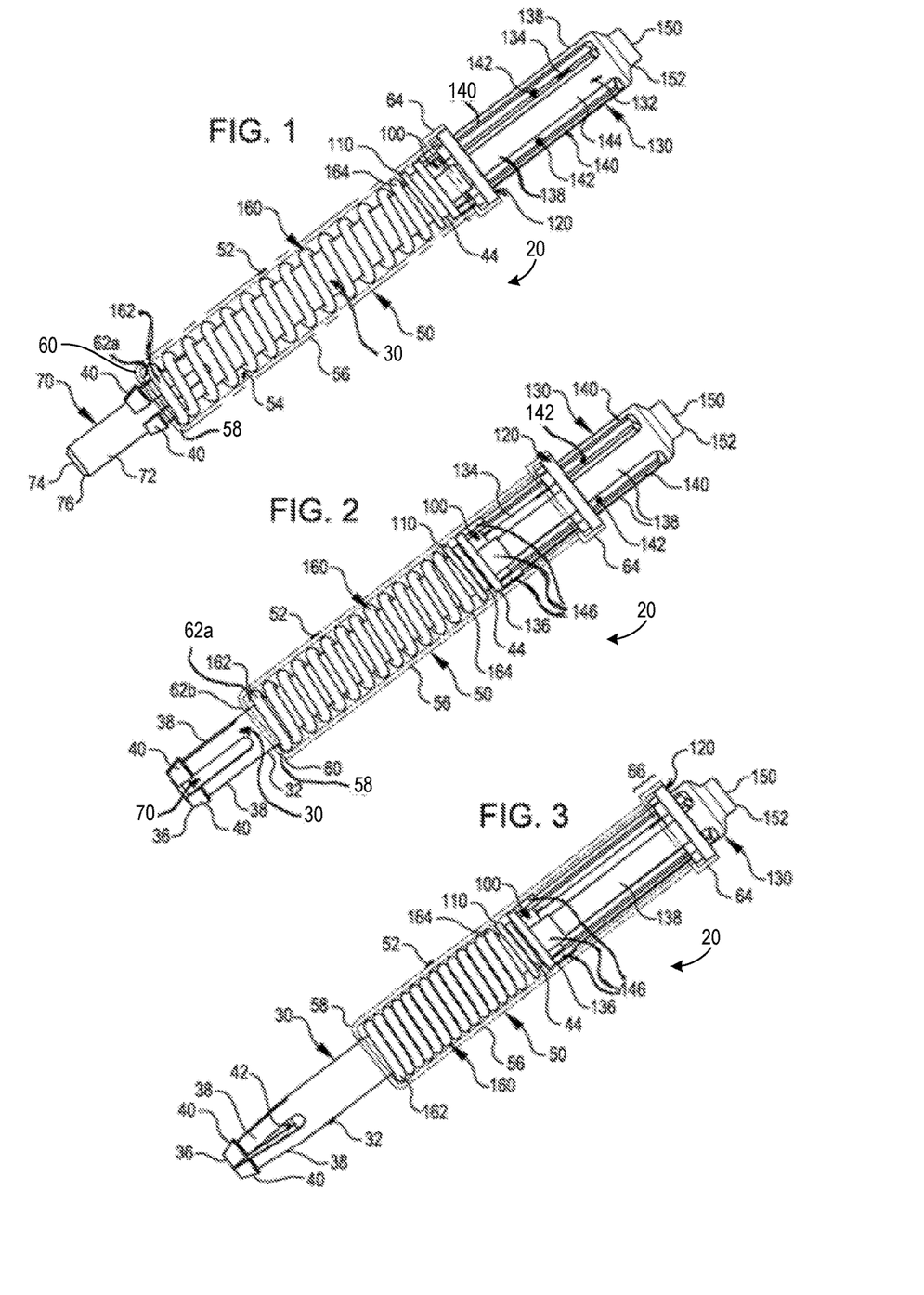
FIG. 1 is an elevation view of a first fastener embodiment with a case there for shown in phantom wherein the fastener is shown in a nominal state.
FIG. 2 is an elevation view of the embodiment of FIG. 1 but wherein the fastener is shown in a partially activated state.
FIG. 3 is an elevation view of the embodiment of FIG. 1 but wherein the fastener is shown in a fully activated state.
Figure 4:
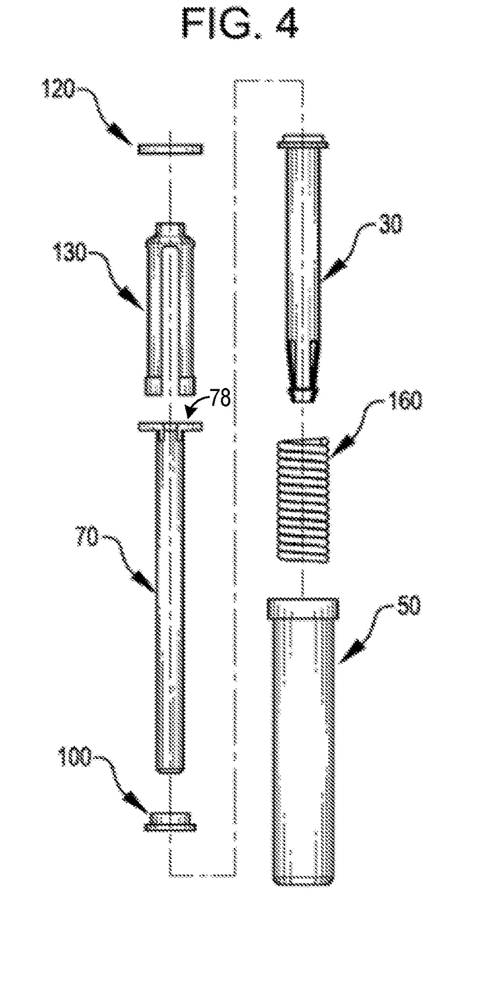
FIG. 4 is an exploded parts elevation view of the fastener of FIG. 1.
Figure 5:
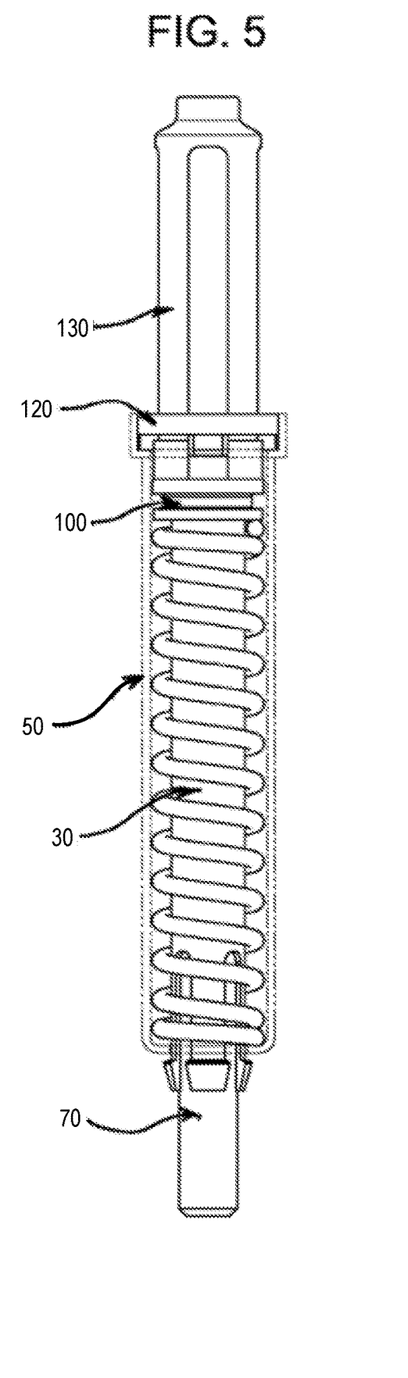
FIG. 5 is an elevation view of the fastener of FIG. 1, shown rotated approximately 90°.
Figure 6:
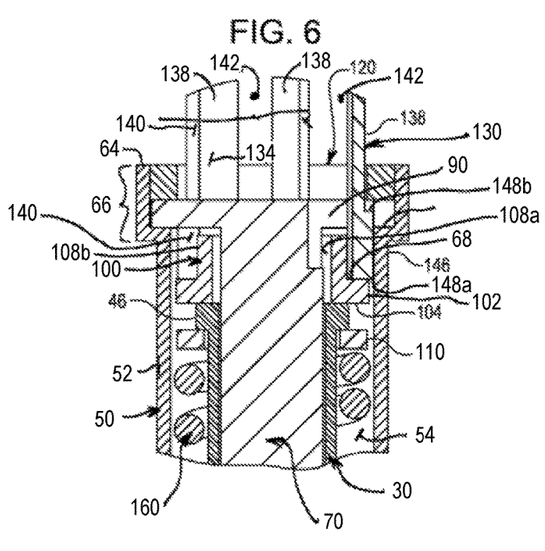
FIG. 6 is a detailed cross section view of the proximal end of the fastener of FIG. 5.
Figure 7:
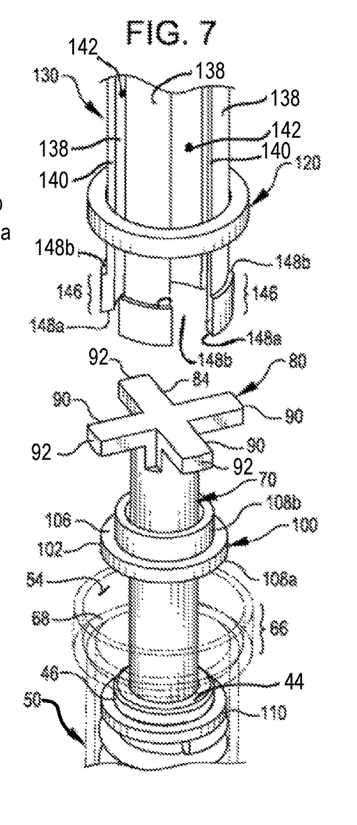
FIG. 7 is an exploded parts perspective view of the proximal end of the fastener of FIG. 5.
Figure 8A:
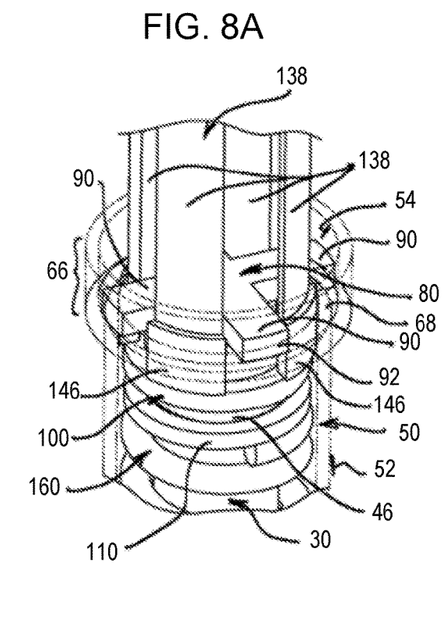
FIG. 8A shows the embodiment of FIG. 7 in a partially assembled state, particularly highlighting the translational meshing of the plunger fingers in the web openings.
Figure 8B:
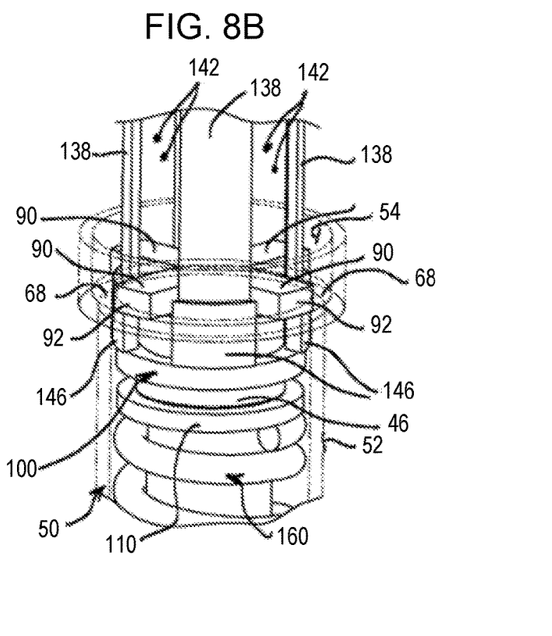
FIG. 8B is an alternative view of the embodiment of FIG. 8A.

Surrounding both a majority of collet body 30 and rod 70 when fastener 20 is in the nominal state shown in FIG. 1 is a bias means in the form of spring 160, and surrounding all these elements is case 50. Case 50 includes outer surface 52 and inner surface 54. The case is bounded by distal end 58 and proximal end 64. Between the distal end and the proximal end 64 is body portion 56. Distal end 58 includes return or lip portion 60, which creates a reduced inner surface diameter orifice there at. This return or lip portion has inner seat 62a, which receives distal end 162 of spring 160, and has outer abutment surface 62b for reacting against a proximal work piece, as is best shown in FIGS. 11 and 12. Proximal end 64 of case 50 includes enlarged portion 66 defining web element seat 68, which is illustrated in FIGS. 6 and 7. The spring 160 also includes a proximal end 164.

The last major element of fastener 20 is plunger 130. Plunger 130, which may be preferably constructed from a polymeric material, has outer surface 132 and inner surface 134 as well as distal end 136 axially or longitudinally opposite proximal end 150. In addition to reduced cost, a polymeric material will usually possess a certain amount of resiliency, which beneficially extends tool life. Lateral impacts or the like on plunger 130 will not cause permanent deformation and consequential loss of functionality. While proximal end 150 includes head 152, which may be formed as required by use considerations, distal end 136 requires consideration of its interface with web element 80 discussed below and shown in FIG. 7. Regardless of the precise nature of web element 80, distal end 136 comprises a plurality if distal ends of fingers 138, which are defined by slots 142 formed in body portion 144. Each slot 142 is bounded by sectional faces 140, which as will be described below, cooperate with sectional faces of the web element to facilitate proper alignment of plunger 130 therein. Additionally, distal end 136 comprises annular ring segments 146 that include distal face 148a for compressively contacting bushing 100 and proximal face 148b for compressively contacting locking ring 120 (see FIG. 7). The bushing 100 includes an outer surface 102.

Also shown in FIGS. 1-4 is optional bushing 110. This element functions as an alignment component providing a suitable seat for annular ring 46 of collet body proximal end 44 at distal facing surface 104 (see FIG. 6), and a suitable seat for distal surfaces 148a of fingers 138 at proximal facing surface 106 (see FIG. 7). Peripheral surface 108a provides additional location support for plunger 130 and rod 70 as it translates along rod 70 towards distal end 58 of case 50, while peripheral surface 108b provides location support for fingers 138 at distal end 136 of plunger 130.

Figure 9A:
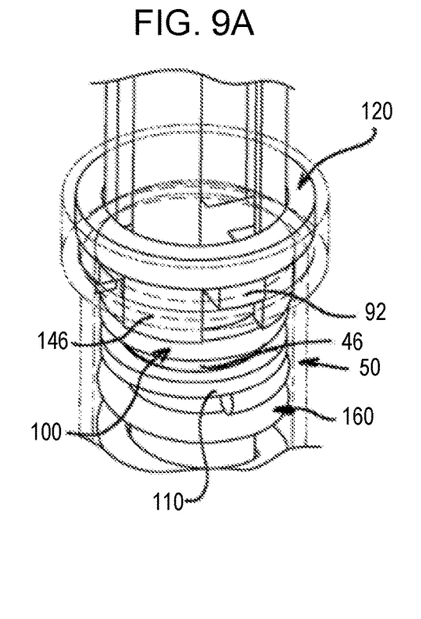
FIG. 9A shows the embodiment of FIG. 8A in a fully assembled state.
Figure 9B:
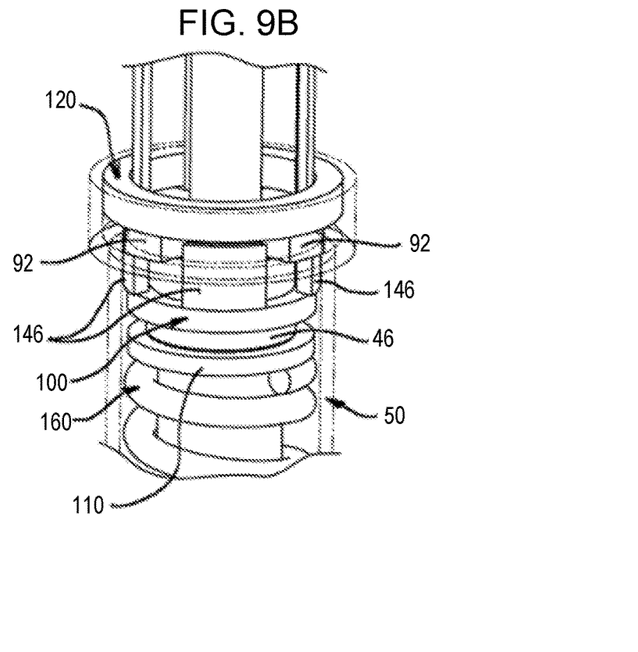
FIG. 9B is an alternative view of the embodiment of FIG. 9A.
Figures 10A, 10B:
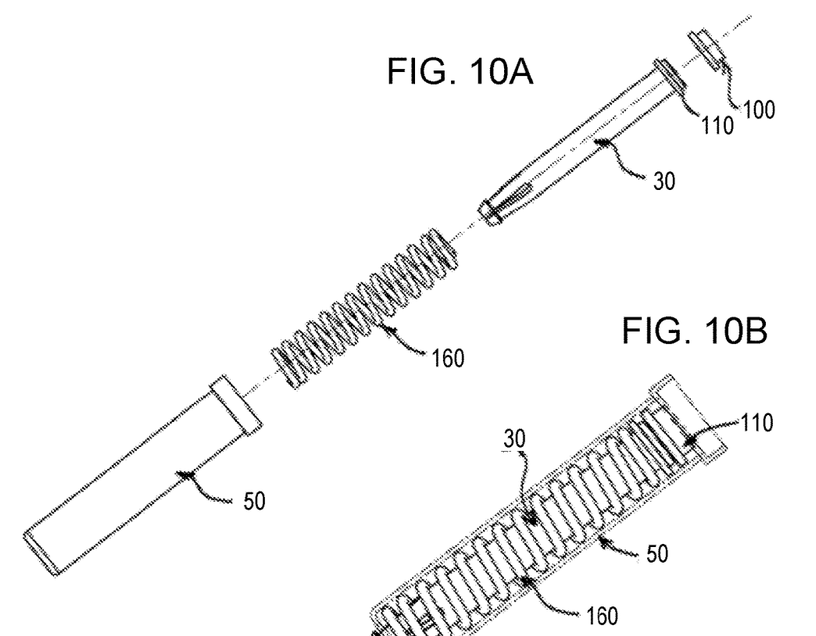
FIGS. 10A-10F sequentially show the assembly of the first fastener embodiment.
Figure 10C:
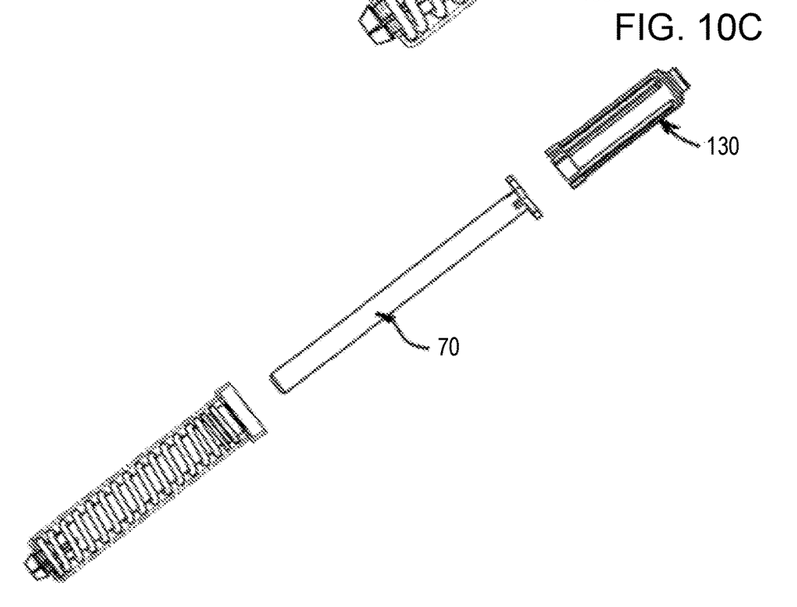
Figures 10D, 10E:
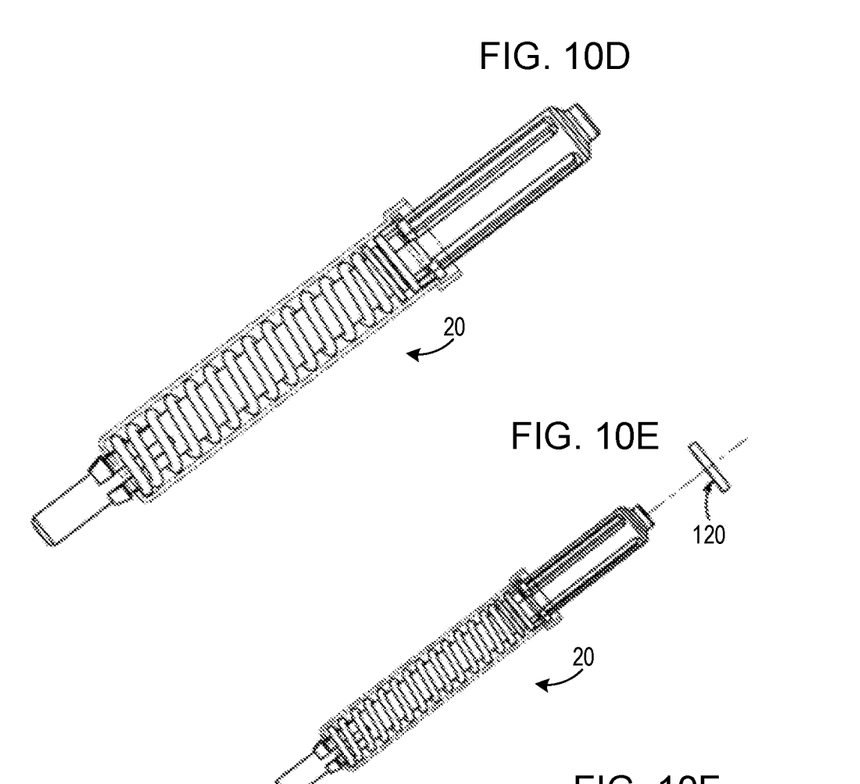
Figure 10F:
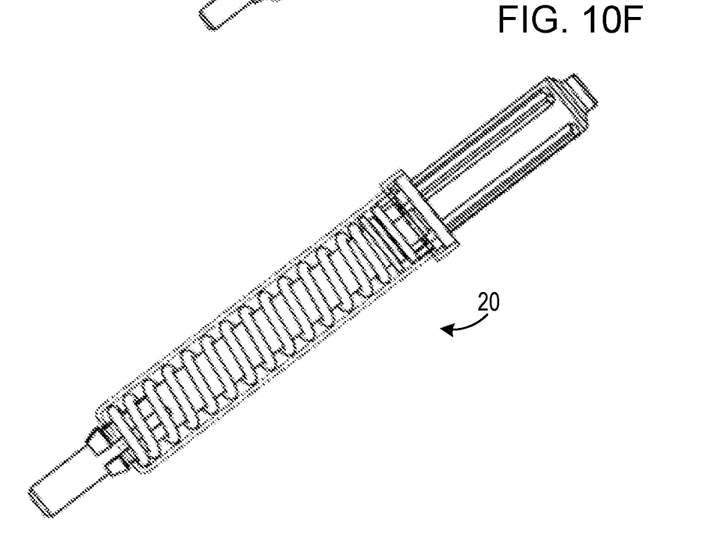

Turning specifically to FIGS. 7-9B, it can be seen that fingers 138 are sized to fit within the openings formed by arms 90 (which form web element 80) and limited by inner surface 54 of expanded portion 66. Arms 90 include outer surfaces 92. To prevent the unintended removal the fingers (or of web element 80) from expanded portion 66, locking ring 120, which may have barbs or buttress threads formed on an outer peripheral surface thereof, is inserted after inclusion of plunger 130 into fastener 20. As best shown in FIGS. 9A and 9B, once seated, locking ring 120 obstructively contacts proximal surfaces 148b of annular ring segments 146 as well as proximal facing surface 84 of web element 80, thereby retaining both within the confines of case 50.

FIGS. 10A-10F illustrate a method of assembling fastener 20, while FIGS. 11 and 12 illustrate a method of compressively associating two work pieces using a fastener. Finally, FIGS. 13 and 14A-14F illustrate an alternative embodiment of a fastener.

The invention claimed is:

1. A temporary fastener, comprising:
   a collet body including an inner surface and having a distal portion including a plurality of flexible fingers each having a gripping portion extending radially from an outer surface;
   a case having an inner surface at least partially surrounding the collet body, a work piece contacting portion, and a distal end;
   a rod at least partially surrounded by the inner surface of the collet body and the case and having a distal end and a proximal end, wherein the distal end of the rod interacts with the plurality of flexible fingers to radially expand the plurality of flexible fingers when the fastener is in a clamped state;
   a plunger having a distal portion including a plurality of plunger fingers each having a distal end, wherein depressing the plunger causes the plurality of distal ends of the plurality of plunger fingers to axially interact with a proximal end of the collet body to cause axial translation of the collet body with regard to the rod extending through a proximal opening of the collet body to place the temporary fastener in an activated state in which the plurality of flexible fingers in the collet body radially converge and the distal end of the rod is retracted within the collet body and axially spaced away from the plurality of flexible fingers in the collet body and wherein releasing the plunger places the temporary fastener in the clamped state in which the plurality of flexible fingers in the collet body are outwardly displaced by an outer surface of the rod axially extending from the collet body;
   a web element positioned at the proximal end of the rod and including a plurality of arms extending in a plurality of radial directions and a plurality of openings positioned between the plurality of arms, wherein the plurality of openings permit the plurality of plunger fingers to axially translate therethrough when the plunger is depressed and released; and
   a spring positioned within the case, including a proximal end bounded by the proximal end of the collet body and a distal end bounded by the distal end of the case, and exerting a restorative force on the proximal end of the collet body and the plunger in response to depression of the plunger.

2. The temporary fastener of claim 1, where the rod and the spring are enclosed within the case when the temporary fastener is in the activated state.

3. The temporary fastener of claim 1, where a distal portion of the rod axially extends away from a distal end of the case when the temporary fastener is in the clamped state.

4. The temporary fastener of claim 1, where the plurality of flexible fingers in the collet body include a first flexible finger spaced away from a second flexible finger and where the collet body includes a rod sleeve at least partially enclosing the rod.

5. The temporary fastener of claim 4, where the plurality of plunger fingers include a first plunger finger and a second plunger finger having a partially annular cross-section.

6. A fastener removably coupling two work pieces, the fastener comprising:
   a collet body including an inner surface and having a distal portion including a plurality of flexible fingers each having a gripping portion extending radially from an outer surface;
   a case having an inner surface at least partially surrounding the collet body, a work piece contacting portion, and a distal end;
   a rod at least partially surrounded by the inner surface of the collet body and the case and having a distal end and a proximal end, wherein the distal end of the rod interacts with the plurality of flexible fingers to radially expand the plurality of flexible fingers when the fastener is in a clamped state;
   a plunger having a distal portion including a plurality of plunger fingers, wherein each of the plurality of plunger fingers includes a distal end and wherein the distal portion includes a plurality of slots and wherein depressing the plunger causes the distal ends of the plurality of plunger fingers to axially interact with a proximal end of the collet body to cause axial translation of the collet body with regard to the rod extending through a proximal opening of the collet body to place the fastener in an activated state in which the plurality of flexible fingers in the collet body radially converge and the distal end of the rod is retracted within the collet body and axially spaced away from the plurality of flexible fingers in the collet body and wherein releasing the plunger places the fastener in the clamped state in which the plurality of flexible fingers in the collet body are outwardly displaced by an outer surface of the rod axially extending from the collet body;
   a web element positioned at the proximal end of the rod and including a plurality of arms extending in a plurality of radial directions and a plurality of openings positioned between the plurality of arms, wherein the plurality of openings permit the plurality of plunger fingers to axially translate therethrough when the plunger is depressed and released; and
   a spring positioned within the case, including a proximal end bounded by the proximal end of the collet body and a distal end bounded by the distal end of the case, and exerting a restorative force on the proximal end of the collet body and the plunger when the plunger is depressed to place the fastener in the activated state.

7. The fastener of claim 6, where the work piece contacting portion of the case and the plurality of gripping portions of the plurality of flexible fingers exert a clamping force on the two work pieces when the fastener is in the clamped state.

8. The fastener of claim 6, where the spring is coupled to the distal end of the case and the proximal end of the collet body.

9. The fastener of claim 6, where the rod is translationally fixed with regard to the case during operation of the fastener and where the web element is fixedly attached to the rod.

10. The fastener of claim 6, where the rod is unthreaded along its length.

11. The fastener of claim 6, further comprising a bushing seated in an annular ring of the proximal end of the collet body and a locking ring surrounding a portion of the plurality of plunger fingers.

12. The fastener of claim 6, where the plurality of flexible fingers in the collet body include a first flexible finger spaced away from a second flexible finger having a partially annular shape and a rod sleeve at least partially enclosing the rod.

13. The fastener of claim 6, where the plurality of plunger fingers include a first plunger finger and a second plunger finger having a partially annular cross-section.

14. A temporary fastener, comprising:
    a case including an inner surface, a work piece contacting portion, and a distal end;
    a collet body at least partially surrounded by the inner surface of the case, the collet body including an inner surface and a plurality of flexible fingers having gripping portions;
    a rod at least partially surrounded by the inner surface of the collet body and the case and including a distal end interacting with the plurality of flexible fingers to radially expand the plurality of flexible fingers when the fastener is in a clamped state wherein the plurality of flexible fingers are outwardly displaced;
    a plunger having a distal portion including a plurality of plunger fingers, wherein each of the plurality of plunger fingers has a partially annular shape, a distal end, and radially extends from a head at a proximal end, and wherein depressing the plunger causes the distal ends of the plurality plunger fingers to axially interact with a proximal end of the collet body to cause axial translation of the collet body with regard to the rod extending through a proximal opening of the collet body to place the fastener in an activated state in which the plurality of flexible fingers radially converge and the distal end of the rod is retracted within the collet body and axially spaced away from the plurality of flexible fingers in the collet body and wherein releasing the plunger places the temporary fastener in the clamped state in which the plurality of flexible fingers in the collet body are outwardly displaced by an outer surface of the rod axially extending from the collet body;
    a web element positioned at a proximal end of the rod and including a plurality of openings positioned between a plurality of radially aligned arms permitting the plurality of plunger fingers to axially translate therethrough when the plunger is depressed and released; and
    a spring positioned within the case, including a proximal end bounded by the proximal end of the collet body and a distal end bounded by the distal end of the case, partially surrounding at least a portion of the collet body and the rod, and exerting a restorative force on the proximal end of the collet body and the plunger when the plunger is depressed.

15. The temporary fastener of claim 14, where the release of the plunger causes the temporary fastener to be placed in the clamped state.

16. The temporary fastener of claim 15, where in the clamped state the gripping portions in the plurality of flexible fingers and a work piece contacting portion in the case exert a clamping force on two work pieces.

17. The temporary fastener of claim 14, further comprising a bushing seated in an annular ring of the proximal end of the collet body and a locking ring surrounding a portion of the plurality of plunger fingers.

18. The temporary fastener of claim 14, where the web element is fixedly coupled to the rod.

19. The temporary fastener of claim 14, where the rod is unthreaded along its length.

\* \* \* \* \*